United States Patent [19]
Huang

[11] Patent Number: 6,158,860
[45] Date of Patent: Dec. 12, 2000

[54] FOLDABLE COMPACT GLASSES

[76] Inventor: David Huang, 2F, 53 Fu-Liu St., Keelung, Taiwan

[21] Appl. No.: 09/360,745

[22] Filed: Jul. 26, 1999

Related U.S. Application Data

[60] Division of application No. 09/005,991, Jan. 12, 1998, Pat. No. 6,017,119, which is a continuation-in-part of application No. 08/802,063, Feb. 19, 1997, abandoned, which is a continuation-in-part of application No. 08/756,112, Nov. 25, 1996, abandoned.

[30] Foreign Application Priority Data

Jun. 27, 1996 [TW] Taiwan ................................. 85209717

[51] Int. Cl.[7] ...................................................... G02C 5/12
[52] U.S. Cl. ............................................. 351/136; 351/78
[58] Field of Search ..................................... 351/136, 137, 351/138, 78, 79, 80, 81

[56] References Cited

U.S. PATENT DOCUMENTS

| | | | |
|---|---|---|---|
| 2,045,508 | 6/1936 | Yoe | 351/138 |
| 2,443,249 | 7/1948 | Jackson | 351/111 |
| 2,975,426 | 3/1961 | Rabb | 351/63 |
| 4,768,872 | 9/1988 | Fraselle et al. | 351/118 |
| 4,806,009 | 2/1989 | Sordillo et al. | 351/137 |
| 5,448,317 | 9/1995 | Huang | 351/63 |

FOREIGN PATENT DOCUMENTS

8320116  5/1994  Taiwan .

Primary Examiner—Huy Mai
Attorney, Agent, or Firm—Ladas & Parry

[57] ABSTRACT

A pair of foldable compact glasses comprising two frames for retraining two lenses therein and each provided with a hinge device at the outer side thereof, two temples each pivoting to the hinge devices, and a bridge device connecting the two frames. A height difference is provided between the hinge devices provided at the outer sides of the two frames so as to prevent the temples from overlaying and interlacing each other while folding and in aid of increasing the lens area, and/or the distance between the bridge device and wearer's nose bridge is increased so as to increase wearer's comfort. The glasses can be subsequently received within a rigid container after folding. This invention future discloses resilient nose pad devices for use in a pair of glasses, which resilient nose pad devices are tightly pressed against each other when the foldable compact glasses are folded so as to reduce overall thickness of the folded glasses.

2 Claims, 8 Drawing Sheets

FOLDABLE COMPACT GLASSES

CROSS REFERENCE

The present application is a division of application Ser. No. 09/005,991 filed on Jan. 12, 1998, now U.S. Pat. No. 6,017,119, which is a continuation-in-part application of application Ser. No. 08/802,063, filed on Feb. 19, 1997, now abandoned, which is a continuation-in-part of application Ser. No. 08/756,112, filed on Nov. 25 1996, now abandoned, by the same inventor.

FIELD OF INVENTION

This invention relates to a pair of foldable compact glasses, particularly to a pair of foldable compact glasses which frames do not obliquely interlace each other after folding so as to provide maximum lens area and which can be conveniently received within a rigid container. This invention future provides resilient nose pad devices that are tightly pressed against each other when the foldable compact glasses are folded so as to reduce overall thickness of the folded glasses.

BACKGROUND OF INVENTION

There are existing various foldable compact glasses which can be received within containers, such as glasses bags, for easy carriage as that disclosed in ROC (Taiwan) Patent Publication No. 282840. However, the temples of such a design interfere with each other easily while folding thereby causing inconvenience to users.

Figure 1:
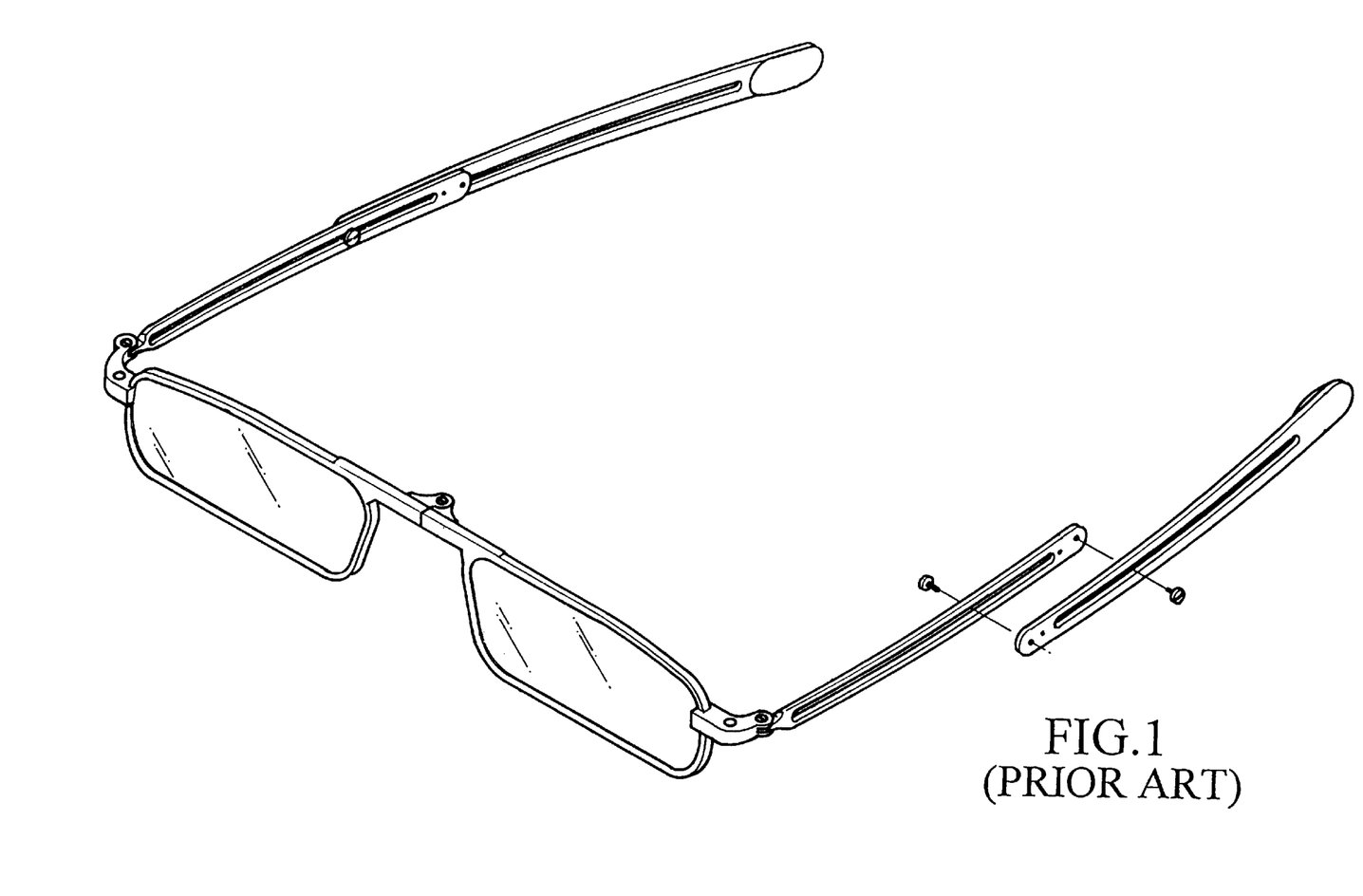
FIG. 1 is a perspective view showing a pair of conventional foldable glasses under an expanded state of use.

A pair of conventional foldable compact glasses is illustrated in FIG. 1, wherein a pivotal device is provided on a foldable bridge device intermediate two frames such that the two frames can be folded toward each other. Because the pivotal device extends toward the wearer, the gap between the two frames is thus larger such that they cannot be tightly opposite of each other while folding thereby interfering the folding of glasses. Furthermore, because the pivotal device extends inwardly (toward the wearer's nose bridge), it also presses against the wearer's nose bridge thereby causing discomfort after prolonged wearing.

Figure 2:
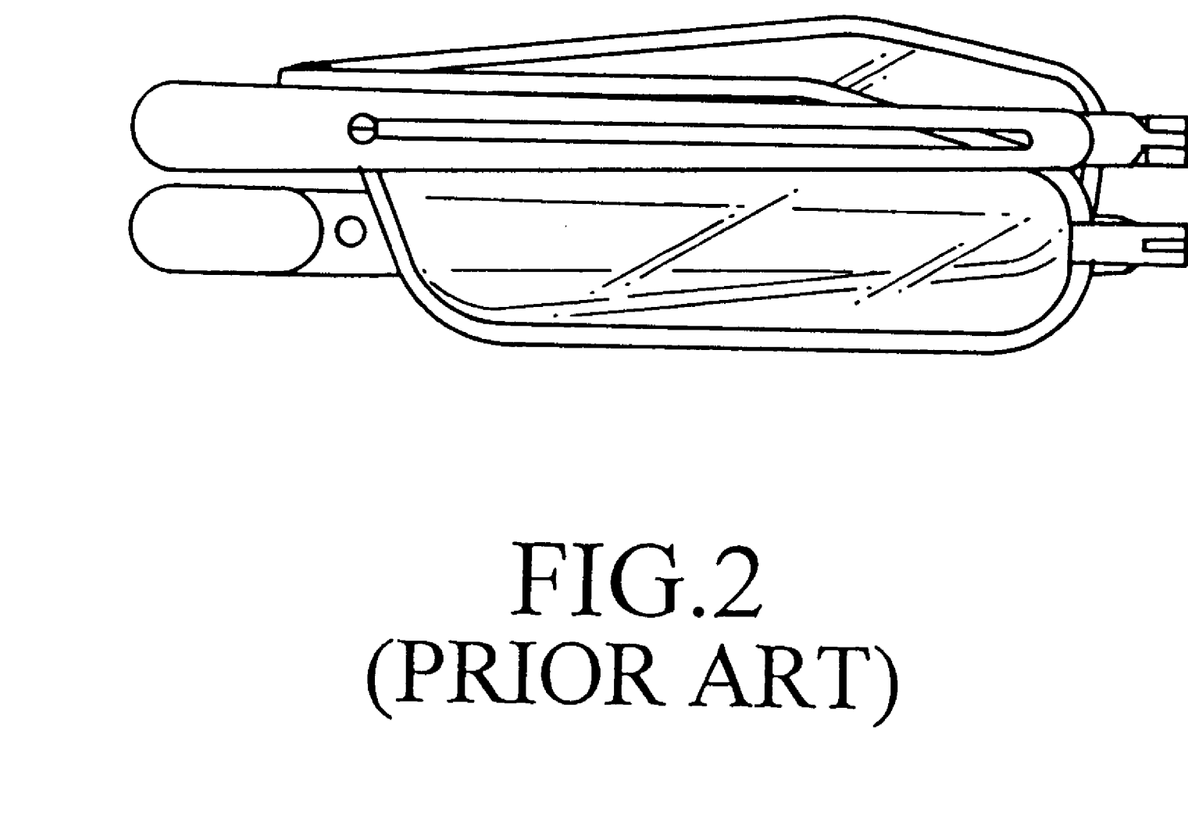
FIG. 2 is a schematic view of prior art illustrating the foldable bridge device thereof under a state of folding.

In order to prevent the temples from interfering with each other while folding, an improved design is known to be related to skewing the rotational axis of the pivotal device provided on the foldable bridge device of the glasses for 3–15 degrees in relative to the vertical axis (as illustrated in FIG. 2) thereby preventing the temples from interfering with each other while folding. However, such an improved design results in an obliquely interlacing arrangement between the two frames of the glasses such that decrements in the sizes of the frames and lenses are indispensable so as to compensate the area occupied by the non-interlaced lens portions and to be received in a container of the same volume.

Another disadvantage of the foldable compact glasses lies in that the small folded volume thereof is easily neglected by the users thereby causing damages thereto by careless squeezes.

Some conventional foldable compact glasses also are provided with nose pads each having a rigid structure. Such nose pads, however, increase overall thickness of the glasses after folded due to their rigidity, whereby the thickness of the folded glasses cannot be further reduced.

The present invention is thus designed to provide a pair of foldable compact glasses in light of the forgoing disadvantages, which glasses are characterized by a height difference provided between the hinge devices pivoting the two temples to outer sides of the frames, and/or a foldable bridge device connecting the two frames being slightly protruded towards the front of frames horizontally so as to prevent temples from obliquely interlacing each other while folding. These characteristics benefit the user in that the glasses may be folded but lens area is not reduced, the gap between the foldable bridge device and the wearer's nose bridge is also increased thereby making the wearing more comfortable. The glasses can further be received within a rigid container so as to prevent the glasses from and to increase protection thereof against accidental occurrences of squeezes and damages.

This invention future provides resilient nose pad devices that can be tightly pressed against each other when the foldable compact glasses are folded so as to reduce overall thickness of the folded glasses.

BRIEF DESCRIPTION OF INVENTION

One object of the present invention is to provide a pair of foldable compact glasses having paired frames, wherein a height difference is provided between hinge devices pivoting two temples to outer sides of the frames eliminating the temples from overlying and interlacing each other while folding such that lenses can be folded toward each other without obliquely interlacing therebetween as well as without reducing lens area.

Another object of the present invention is to provide a pair of foldable compact glasses having paired frames, wherein a foldable bridge device slightly extends towards front of the frames horizontally so as to increase the gap between the foldable bridge device and the wearer's nose bridge thereby eliminating unnecessary pressing or aching after prolonged wearing and increasing comfort to the wearer.

A further object of the present invention is to provide a compact and rigid container for such foldable compact glasses thereby preventing the glasses from and increasing the protection thereof against accidental occurrences of squeezes and damages.

A further object of the present invention is to provide resilient nose pad devices that are tightly pressed against each other when the foldable compact glasses are folded so as to further reduce overall thickness of the folded glasses.

The structure and features of the present invention can be readily realized by those skilled in the art with reference to the description of the preferred embodiment accompanied with the drawings.

DETAILED DESCRIPTION OF PREFERRED EMBODIMENT

For the ease of explaining the structural design of this invention, the horizontal plane to which the specification refers, refers to the plane on which the temples is rested on after being expanded.

Figure 3:
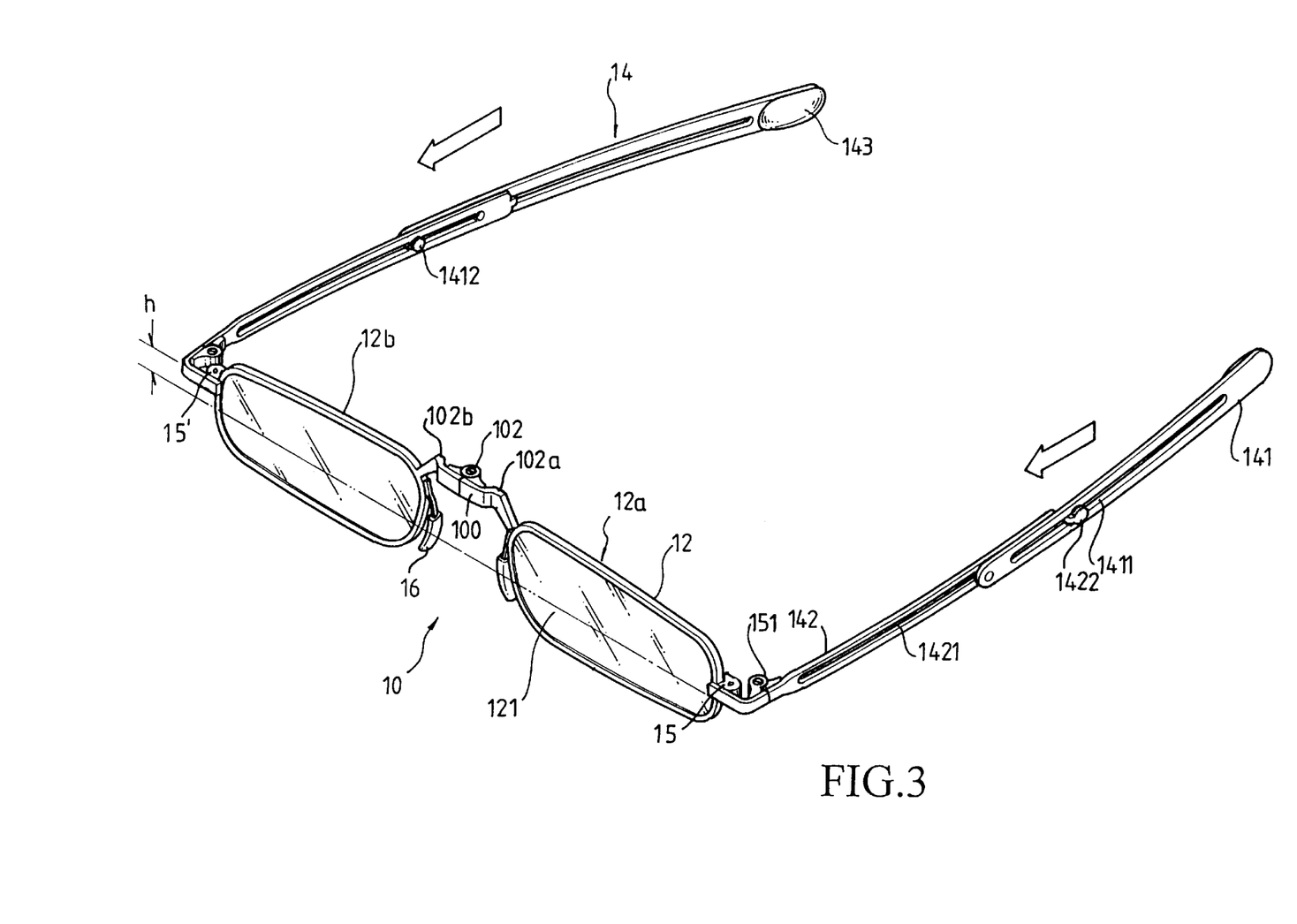
FIG. 3 is a perspective view of a pair of foldable compact glasses according to the present invention under an expanded state of use.

FIG. 3 illustrates an embodiment of a pair of foldable compact glasses 10 according to this invention under an expanded state. The glasses 10 comprise two frames 12, two hinge devices 15, 15', two temples 14, a foldable bridge device 100, and two nose pad devices 16, wherein the two frames 12 are provided for retaining two lenses 121 therein and the two hinge devices 15, 15' integrally formed or secured to the outer sides thereof have pivotal axes normal to the horizontal plane, and the bridge device 100 for connecting the two frames 12 is provided with a pivotal device 102 thereon which is rotatable about a pivotal axis substantially parallel to the pivotal axes of the hinge devices 15, 15' provided at the outer sides of the frames 12.

The retractable temples 14 as illustrated in FIG. 3 enable the compact glasses 10 to be folded into a smaller volume. The temples 14 illustrated in FIG. 3 each comprise a retractable temple member 141 and a stationary temple member 142. The temples members 141, 142 are each formed with a temple sliding slot 1411, 1421 between opposite ends thereof. One end of the retractable temple member 141 is provided with a connecting device 1412 for clinching into the sliding slot 1421 of the stationary temple member 142. The stationary temple member 142 has a free end being provided with another connecting device 1422 for clinching into the sliding slot 1411 of the retractable temple member 142 such that the retractable temple member 142 can be frictionally and slidably positioned within the sliding slot 1421 of the stationary temple member 142. In the embodiment illustrated in FIG. 3, the connecting devices 1412, 1422 are, respectively, a template catch button and a bolted screw. According to an embodiment of the present invention, a temple pad 143 is attached to an inner side of the end of the retractable temple member 141 so as to enhance comfort while wearing.

Figure 5:
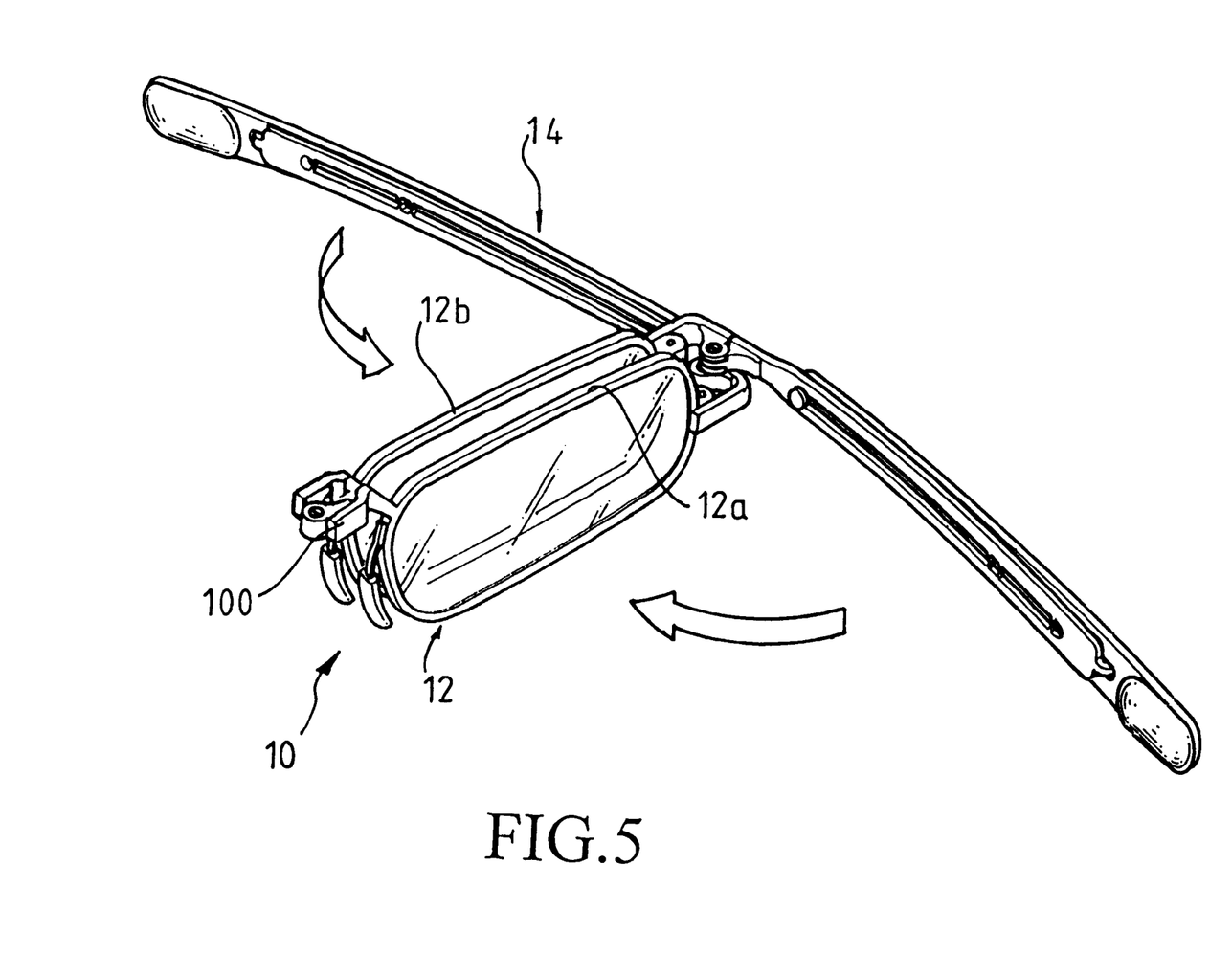
FIG. 5 is a perspective view illustrating the foldable compact glasses of FIG. 3 when the temples thereof is under a state of folding.

As illustrated in FIGS. 3 and 5, the hinge device 15' provided at the outer side of one of the frames 12 is slightly higher than that of the other hinge device 15 at the outer side of another frame 12 (or vice versa) in relation of the horizontal plane. That is, the vertical distance from the hinge device 15' to the upper frame edge 12a is slightly smaller than the vertical distance h from the hinge device 15 to the upper frame edge 12b. The height difference is preferably 2–8 mm for adapting the hinge devices 15, 15' to be stackedly folded in parallel. Such a feature enables the temples 14 to be folded in parallel without overlaying and interlacing each other as compared with the prior art while folding the frames 12 about the pivotal axis of the bridge pivotal device 102. Though the two hinge devices 15, 15' are not placed on the same horizontal plane, the expanded length of the temples 14, however, subjects the ends of the temples 14 to be substantially on the same plane while wearing.

As illustrated in FIG. 3, the pivotal device 102 of the bridge device 100 of the foldable compact glasses 10 is designed to protrude toward the front of frames 12. That is, the pivotal axis of the pivotal device 102 extends along the same plane of or slightly forwardly protrudes from the two frames 12. Preferably, the opposite ends 102a, 102b of the bridge device 102 connecting to the upper frame edges 12a, 12b protrude 10–15 degrees toward the front of frames 12 in a horizontal direction. Such a forward-protruding design increases the gap between the bridge pivotal device 102 and the wearer's nose bridge such that the pivotal device 102 does not contact with the wearer's nose bridge thereby eliminating discomfort and further enables the two frames 12 to be smoothly and obediently overlaid while folding toward each other.

Furthermore, the nose pad devices 16 of the foldable glasses provided at inner sides of the two frames 12 are adapted to support the glasses onto the wearer's nose bridge.

Figure 4:
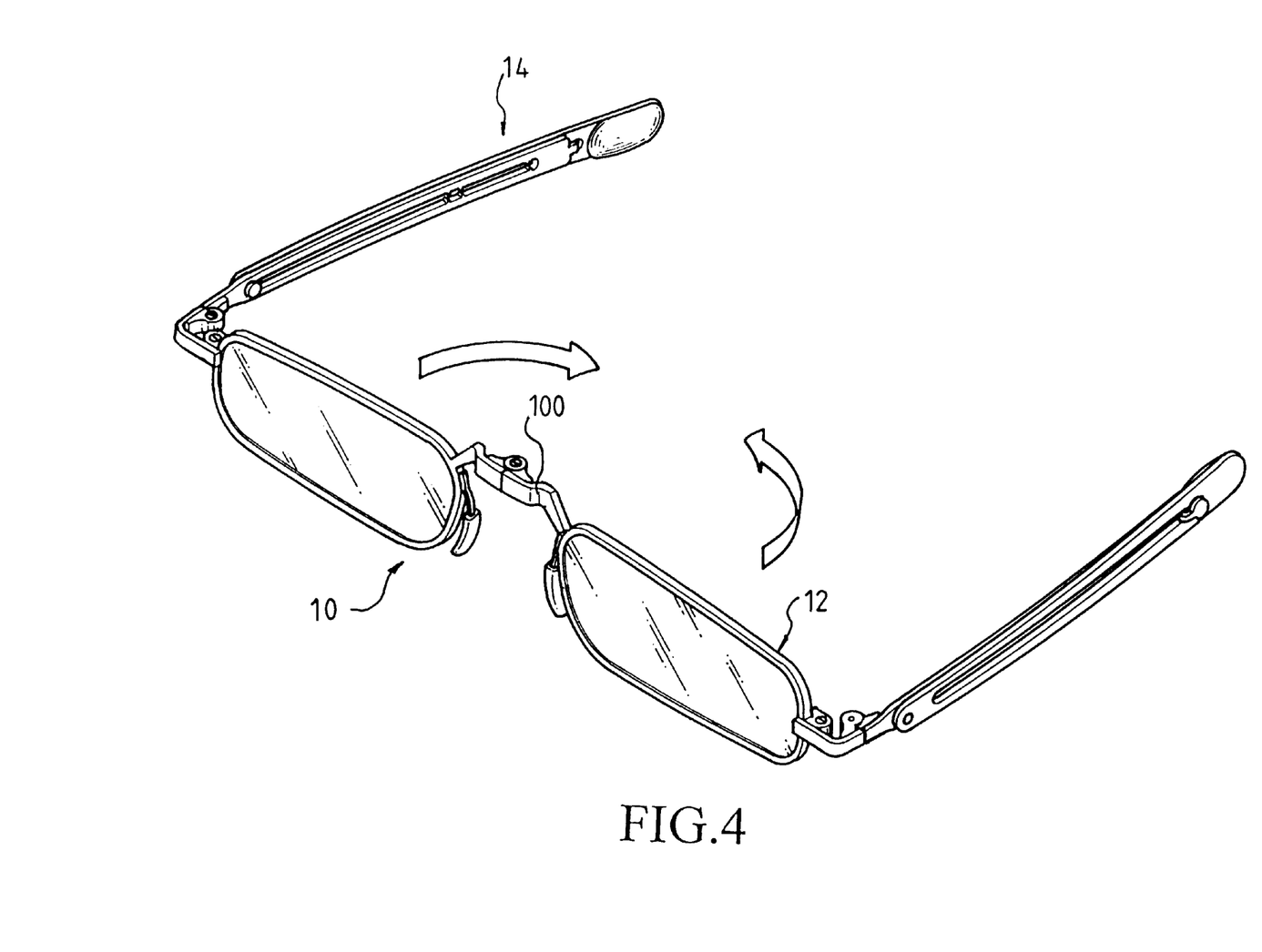
FIG. 4 is a perspective view illustrating the foldable compact glasses of FIG. 3 when the temples thereof is under a state of retraction.
Figure 6:
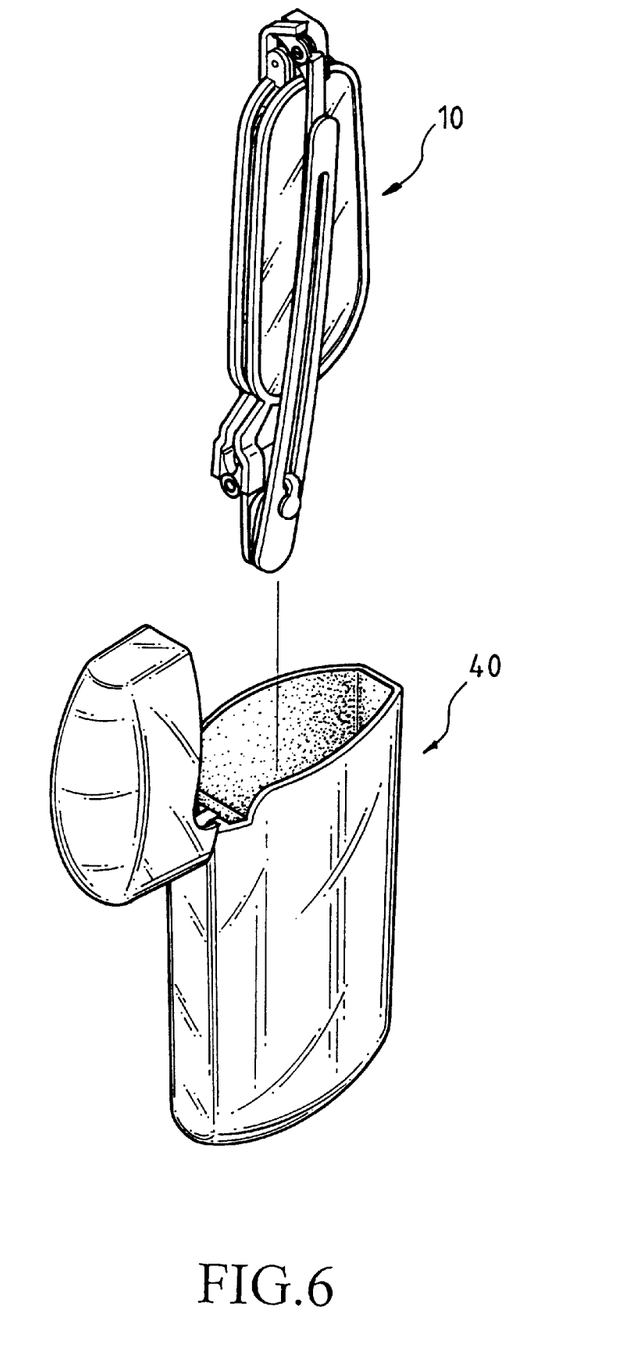
FIG. 6 is a reference view of the foldable compact glasses of FIG. 3 under a state of being completely folded and readily received in a rigid container.

To receive the foldable compact glasses 100 of FIG. 3, the connecting devices 1412 of the retractable temples 14 are each firstly slid along the sliding slot 1421 of the stationary member 142 (according to the direction of the arrow shown in FIG. 3.) The two frames 12 are then inwardly folded about the pivotal axis of the bridge pivotal device 102 (according to the direction of the arrow shown in FIG. 4), wherein the two frames 12 do not interfere with each other due to the aforementioned difference in height between the frame hinge devices 15, 15' and the forwardly protruded design of the bridge device 102 such that the frames 12 are folded in a smoothly overlaid opposing manner and adopt a non-interlaced arrangement, as illustrated in FIG. 5. Finally, the retracted temples 14 are inwardly folded about the pivotal axes of the hinge devices 15, 15' provided the outer sides of the frames 12 toward the frames 12 (according to the direction of the arrow shown in FIG. 5). The glasses 100 are thus folded into a tight and compact volume and can then be received into a rigid container 40 along a pivotal axis thereof, as shown in FIG. 6. The size of the completely folded glasses is substantially similar to that of a hand-held lighter for being conveniently carried by a user.

The temples 14 illustrated in FIG. 3 can also be replaced by conventional ones. Other conventional connecting measures can otherwise be implemented to slidably interconnect the stationary temple member 142 and retractable temple member 141 Such equivalent variations can be conducted by persons in this art.

Figure 7:
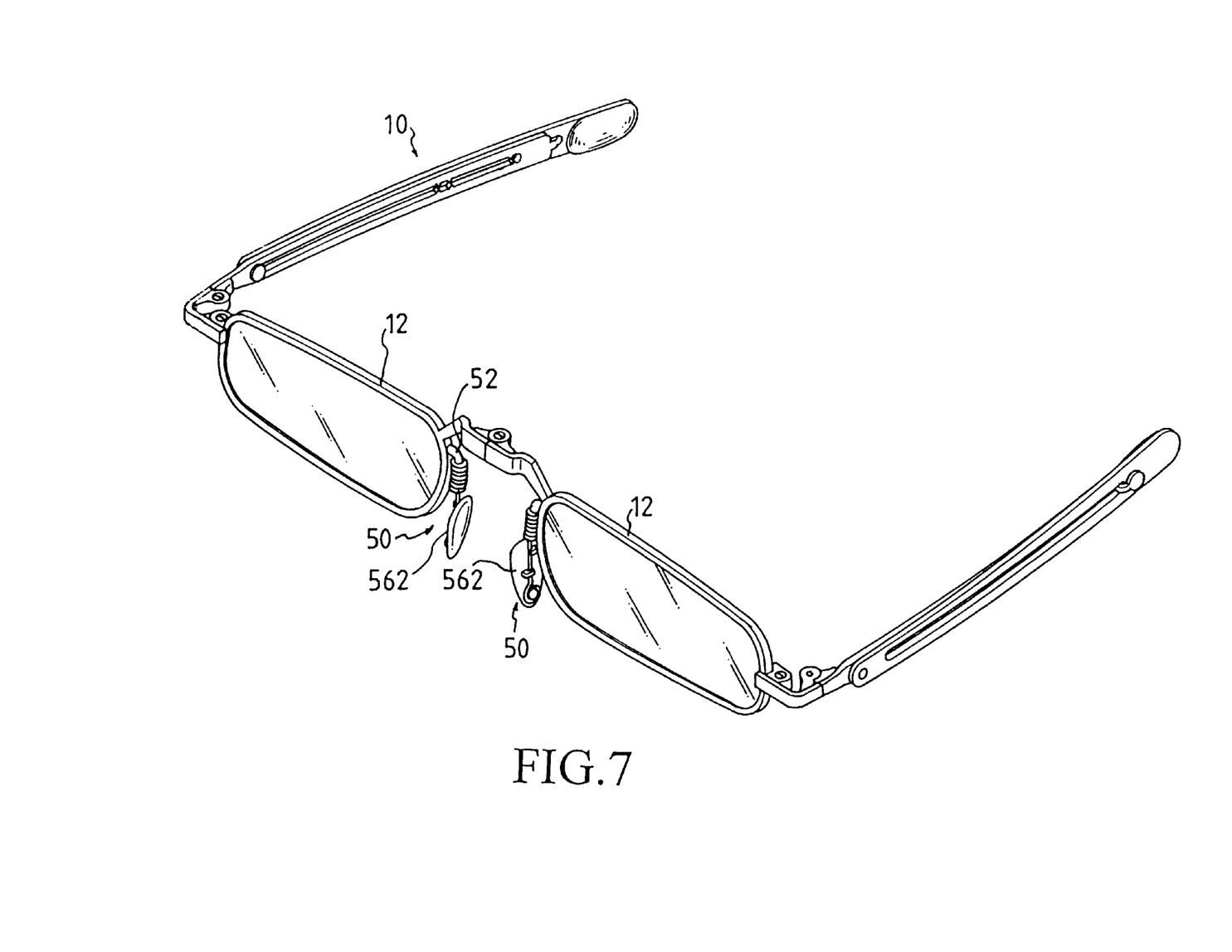
FIG. 7 is a perspective view of a pair of foldable compact glasses having resilient nose pad devices according to the present invention under the expanded state of use.
Figures 8, 9:
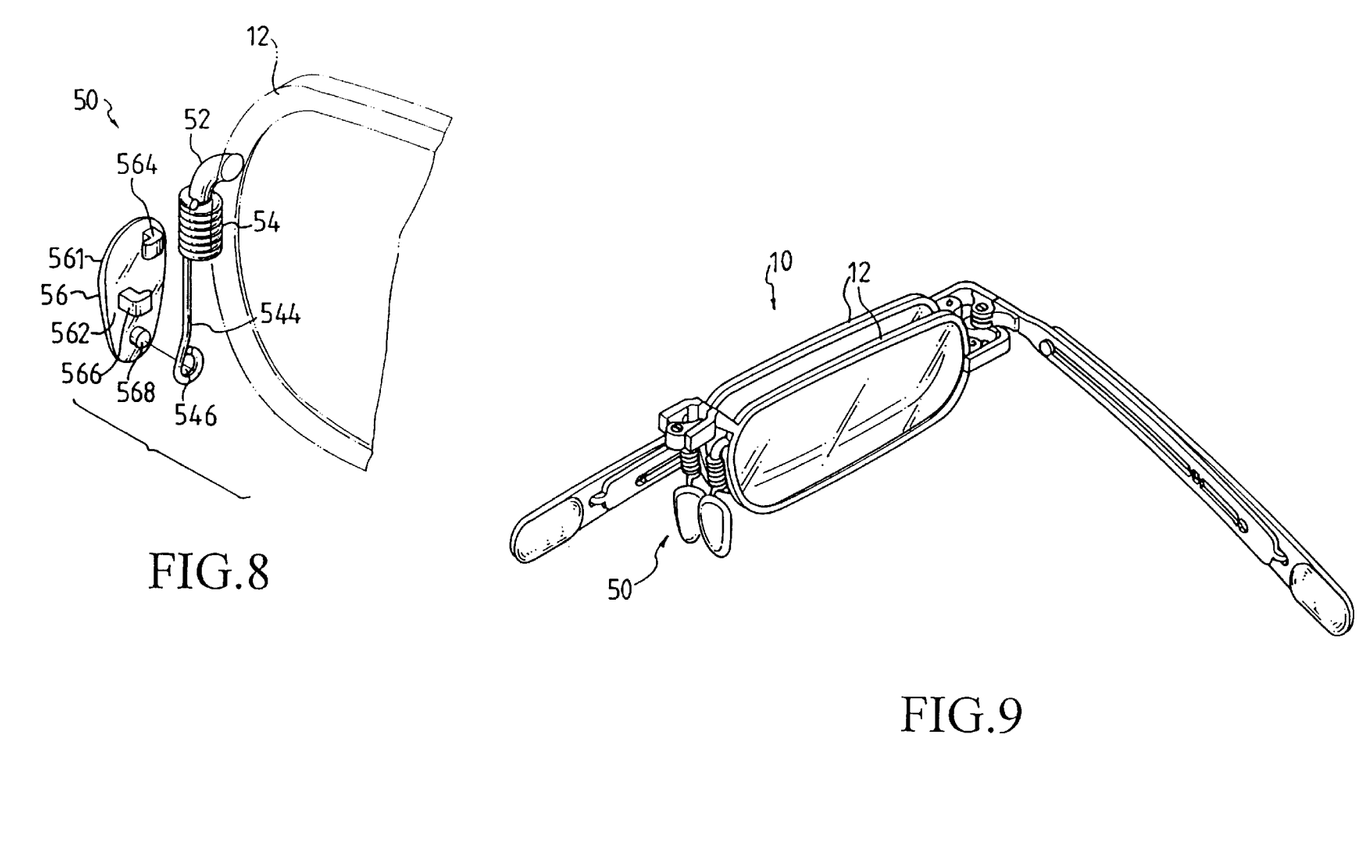
FIG. 8 is an enlarged perspective view illustrating the resilient nose pad device according to the present invention.
FIG. 9 is a is a perspective view illustrating the resilient nose pad devices according to the present invention being tightly pressed against each other when the foldable compact glasses are under a state of being folded.

With reference to FIGS. 7 and 8, FIG. 7 is a perspective view of a pair of foldable compact glasses 10 having resilient nose pad devices 50 according to the present invention and FIG. 8 illustrates an enlarged view of one of the resilient nose pad devices 50 according to the present invention. The nose pad device 50 comprises a bent shaft 52 having a first end secured to opposing inner sides of the frames 12, a resilient spring 54, and a nose pad 56. The resilient spring includes an end 542 secured to a second end of the shaft 52, a stem portion 54, and an opening 546 formed at another end thereof. The nose pad 56 has a first surface 561 and a second surface 562. The second surface 562 of the nose pad 56 is provided with clinching devices for securing the nose pad 56 to the spring 54. In an embodiment of this invention, the clinching devices includes two L-shaped nodes 564, 566 each having an open side, wherein the open sides oppose each other for clinching the stem portion 54 of the spring 54 therein. The second surface 562 of the nose pad 56 is further provided with a projecting node 568 for inserting into the opening 546 formed at the another end of the spring 54. As illustrated in FIG. 7, the nose pads 56 may be such arranged that the first surfaces 562 thereof Conform to the profile of wearer's nose bridge.

FIG. 9 is a is a perspective view illustrating the resilient nose pad device 50 when the foldable compact glasses 10 are under a state of being folded. As illustrated in FIG. 9, the two nose pad devices 50 are tightly pressed against each other due to resilience of the springs 54 whereby a thin thickness of the folded glasses is maintained disregard existence of the nose pads 56.

Aforementioned explanation is directed to the description of the preferred embodiment according to the present invention. Various changes and implementations can be made by those skilled in the art without departing from the technical concept of the present invention. Since the present invention is not limited to the specific details described in connection with the preferred embodiment except those that may be within the scope of the appended claims, changes to certain features of the preferred embodiment without altering the overall basic function of the invention are contemplated.

What is claimed is:

1. A resilient nose pad device for use in a pair of glasses having paired frames, comprising:

a bent shaft having a first end secured to opposing inner sides of the frames and a second end;

a resilient spring having an end secured to the second end of the bent shaft, a stem portion, and an opening formed at another end thereof; and a nose pad having a first surface for pressing against wearer's nose bridge, and a second surface provided with clinching devices for securing the nose pad to the resilient spring, the clinching device including two L-shaped nodes each having an open side opposing each other for clinching the stem portion of the spring therein, and a projecting node for inserting into the opening formed at the another end of the resilient spring.

2. The nose pad device according claim 1, wherein the first surface of the nose pad conforms to wearer's nose bridge profile.

* * * * *